United States Patent [19]
Dawson

[11] Patent Number: 6,016,827
[45] Date of Patent: Jan. 25, 2000

[54] CONTROL VALVE FOR ONBOARD REFUELING VAPOR RECOVERY FUEL SYSTEM

[75] Inventor: Gary D. Dawson, Rochester, Mich.

[73] Assignee: DaimlerChrysler Corporation, Auburn Hills, Mich.

[21] Appl. No.: 09/217,499

[22] Filed: Dec. 21, 1998

[51] Int. Cl.[7] .................................................. F16K 24/04
[52] U.S. Cl. .............................. 137/202; 137/43; 137/587
[58] Field of Search ............................... 137/43, 202, 587

[56] References Cited

U.S. PATENT DOCUMENTS 4,760,858  8/1988  Szlaga .
4,991,615  2/1991  Szlaga et al. .
5,028,244  7/1991  Szlaga .
5,449,029  9/1995  Harris .

*Primary Examiner*—Gerald A. Michalsky
*Attorney, Agent, or Firm*—Kenneth H. Maclean

[57] ABSTRACT

A control valve for an onboard refuel vapor recovery system employing two bleed orifices in the body of the control valve that are effective to provide different time intervals for continuing to dispense fuel into the fuel tank after an initial fill nozzle shut-off.

10 Claims, 4 Drawing Sheets

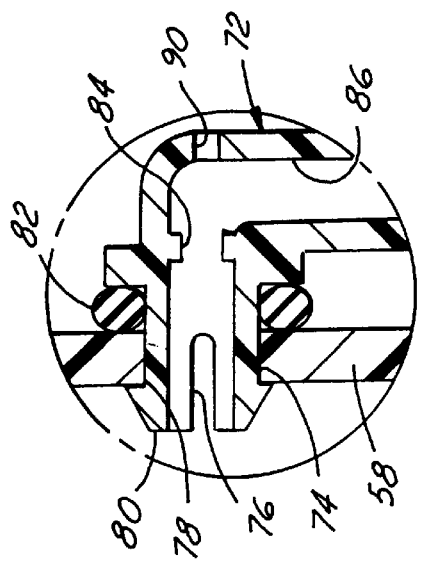
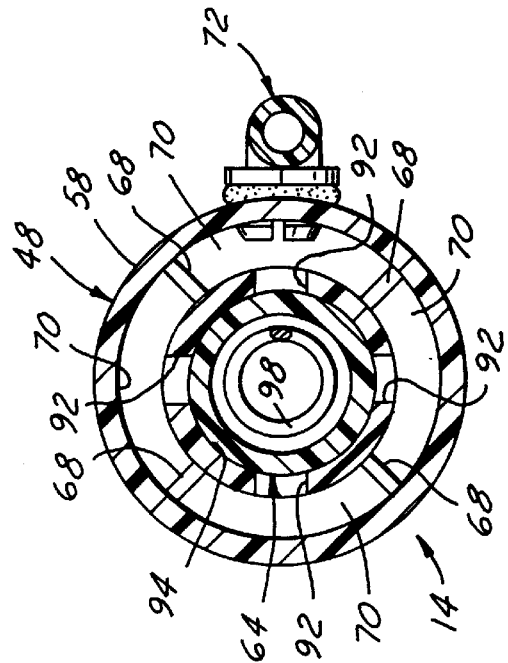
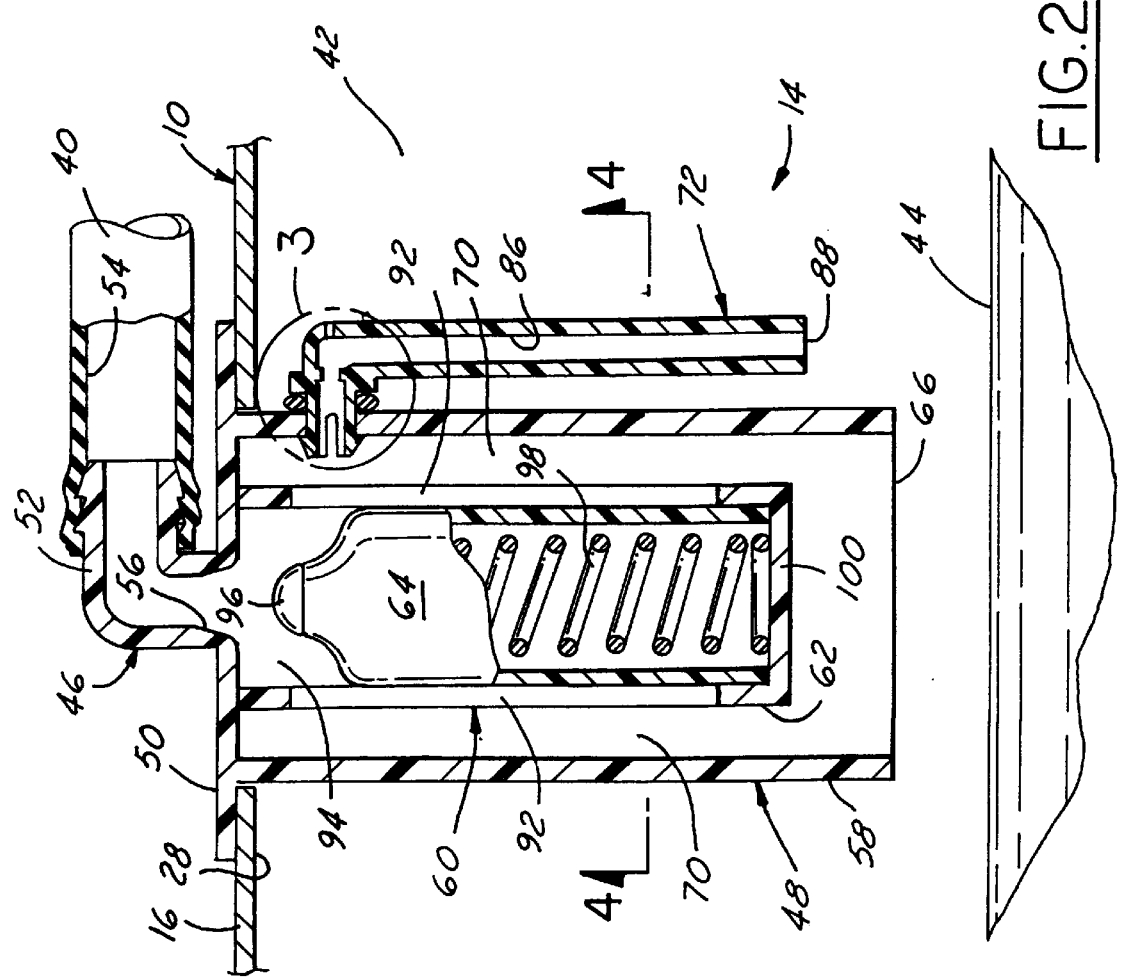

CONTROL VALVE FOR ONBOARD REFUELING VAPOR RECOVERY FUEL SYSTEM

TECHNICAL FIELD

This invention concerns control valves and, more particularly, relates to a control valve for establishing the fuel fill level of a fuel tank and for allowing fuel vapor to flow to a vapor recovery canister during and after the filling of the fuel tank with the fuel level being at a desired nominal capacity.

BACKGROUND OF THE INVENTION

It is quite common for persons refueling their vehicles to add additional fuel after the initial fill nozzle shut-off. Often this is done in an attempt to "round up" the payment to some convenient amount to minimize the amount of "change" involved in the transaction. Surveys have indicated that providing some amount of "round-up" during refueling is a desirable customer feature. A less frequent occurrence is for the operator to attempt to maximize the amount of fuel put into the fuel tank. This is typically accomplished by dispensing the fuel slowly over an extended period of time. This is generally described as "trickle-fill" by those involved in fuel system development.

The amount of "round-up" or "trickle-fill" needs to be limited so as to prevent overfilling of the fuel tank. The fuel tank must retain sufficient vapor space above the fuel to allow vapors to vent to the canister under such conditions as thermal expansion and parking on grades.

A control valve made by Stant Manufacturing Inc., Connersville, Indiana serves to vent fuel vapor from the vapor space in a fuel tank during early stages of refueling. In addition, the control valve blocks introduction of fuel in excess of a nominal volume so as to preserve a volume of the vapor space in the fuel tank once the fuel tank is filled to its rated capacity. The control valve is one part of a comprehensive Onboard Refueling Vapor Recovery (ORVR) vehicle fuel system that allows pump operators some latitude to "round-up" their fuel tanks without overfilling the fuel tanks. During the "round-up" phase of filling the fuel tank, a single bleed orifice provided in the control valve allows the valve to open to provide venting of the fuel tank.

One problem with having a single orifice in the Stant control valve is that it brings into conflict two system requirements. The first requirement, the ability to add fuel ("round-up") after the initial nozzle shut-off, requires a larger orifice to allow the valve to reopen quickly so more fuel can be added to the fuel tank. The other requirement, to discourage the pump operator from continuing to "trickle fill" so as to prevent overfilling the fuel tank, requires a smaller orifice to delay reopening of the valve. In order to fulfill both requirements, the single orifice arrangement results in a compromise orifice size which is not entirely satisfactory.

SUMMARY OF THE INVENTION

The present invention is directed to a control valve for an ORVR vehicle fuel system that solves the above problem by providing a control valve construction employing two bleed orifices in the body of the control valve that are effective to provide different time intervals for continuing to dispense fuel into the fuel tank during the "round-up" and "trickle-fill" phases of filling the fuel tank. This is accomplished in accordance with the present invention by having one orifice of a size that allows the valve to reopen quickly in the round-up phase of the fill so that the pump operator can squeeze the lever handle of the pump nozzle a few times in quick succession after the automatic nozzle shutoff has occurred. Where the fuel level in the fuel tank rises to a predetermined capacity level, the other smaller orifice becomes effective to cause the valve to remain closed for a longer period of time. This longer time period should help convince the pump operator that the fuel tank is filled to its capacity and there is no reason to dispense any further fuel into the fuel tank. After the longer period of time expires, the valve will open again so that vapor in the fuel tank can be exhausted into the vapor recovery canister.

Accordingly, it is an object of the present invention is to provide a new and improved control valve for an ORVR system which allows a pump operator to fill with the time interval for re-activation of the pump nozzle initially starting with a short period of time and ending with a longer period of time.

Another object of the present invention is to provide a new and improved control valve for an ORVR system employing two bleed orifices in the body of the control valve that are effective to provide different time intervals for continuing to dispense fuel into the fuel tank after the initial fill nozzle shut-off.

A further object of the present invention is to provide a new and improved control valve for an ORVR system for establishing the fuel fill level of a fuel tank and in which the control valve is provided with two bleed orifices which serve to allow the pump operator to fill the fuel tank to a predetermined fill level while discouraging further filling so as to prevent overfilling of the fuel tank.

A still further object of the present invention is to provide a new and improved control valve for an ORVR system that incorporates structure located at two different levels and that is combined with two bleed orifices of different sizes that cooperate with the structure for providing different time intervals for filling the fuel tank after the initial nozzle shut-off.

The above objects and others are realized in accordance with the present invention by a control valve for an ORVR fuel system that includes a fuel tank having a chamber into which fuel is dispensed and is defined by a top wall, a bottom wall and side walls and includes a filler neck provided with an open mouth for accommodating a fuel nozzle. The control valve is sealingly mounted in the top wall of the fuel tank and comprises a cap portion located above the top wall and a body portion which extends into the fuel tank. The cap portion is formed with a vapor inlet opening leading to the body portion of the control valve and is also formed with a vapor outlet opening which connects with a vapor recovery canister. The body portion includes a side wall surrounding a valve assembly and is spaced therefrom so as to define an annular channel. The valve assembly includes a housing member that is provided with a float valve. The housing member is formed with at least one side opening so as to allow fuel vapor in the fuel tank to flow through the annular channel to the canister through the inlet and outlet openings in the cap portion when the float valve is in the open position. The side wall of the body portion terminates with a bottom edge located at a first level and has a first orifice of a predetermined size formed in the side wall adjacent the cap portion for providing communication between the chamber of the fuel tank and the annular channel. The body portion of the control valve includes a passage which is connected to the first orifice and terminates at a second level above the bottom edge of the side wall. In addition, the body portion has a second orifice of a size smaller than the size of the first orifice for allowing fuel vapor in the chamber of the fuel tank to flow through the passage and through the first orifice to the annular channel when the fuel in the fuel tank is located at the second level and the float valve is in the open position. The arrangement is such that when fuel is dispensed into the fuel tank and rises to the first level and above but not to the second level, internal pressure in the fuel tank causes the fuel to rise in the annular channel to raise the float valve to close the inlet opening in the cap portion and prevent fuel from being dispensed into the fuel tank for a predetermined time interval. Afterwards, the float valve drops and opens the inlet valve to allow further filling of said fuel tank. The filling process may be repeated a few times. After further filling of the fuel tank, the fuel rises to the second level (nominal fill level) and the internal pressure in the fuel tank causes the fuel to rise again in the annular channel to raise the float valve and again close the inlet opening in the cap portion to prevent fuel from being dispensed into the fuel tank for a time interval greater than the aforementioned predetermined time interval so as to discourage any further filling of the fuel tank.

BRIEF DESCRIPTION OF THE DRAWINGS

Other objects and advantages of the present invention will be more apparent from a reading of the following detailed description when taken with the drawings in which:

FIG. 2 is an enlarged transverse sectional view of the control valve shown in FIG. 1;

FIG. 3 is a further enlarged view of the circled area of the control valve shown in FIG. 2;

FIG. 4 is a sectional view taken on line 4—4 of FIG. 2;

DETAILED DESCRIPTION OF THE DRAWINGS

Figure 1:
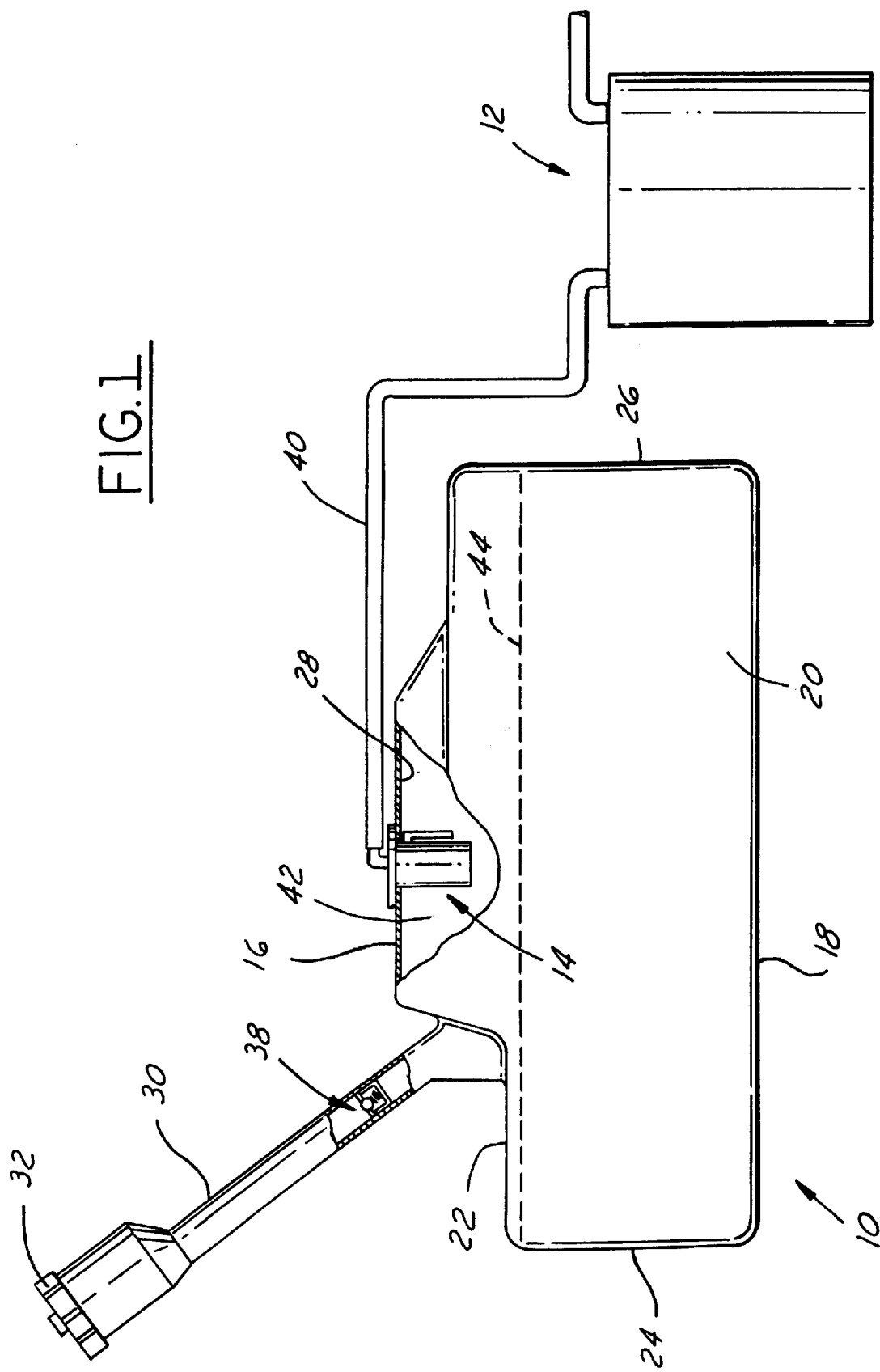
FIG. 1 is a diagrammatic view of a vehicle fuel tank incorporating a control valve made in accordance with the present invention and combined with a vapor recovery canister.

Referring to FIG. 1 of the drawings, a diagrammatic view of certain fuel system components are shown that would form a part of a complete Onboard Refueling Vapor Recovery (ORVR) vehicle fuel system. To simplify the showing and description of the present invention, the fuel system shown in FIG. 1 includes only a vehicle fuel tank 10, a vapor recovery canister 12, and a control valve 14 made in accordance with the present invention.

As seen in FIG. 1, the fuel tank 10 is generally rectangular in configuration. It consists of a top wall 16, bottom wall 18, and four side walls 20, 22, 24, and 26, two of which are located at opposite ends of the fuel tank 10. The walls 20–26 serve to define an inner chamber 28 into which liquid fuel for an internal combustion engine (not shown) of a vehicle (not shown) is dispensed via a filler neck 30 attached to and extending upwardly from the main body of the fuel tank 10. The filler neck 30 is shown closed at its mouth by a filler cap 32 which, when removed, (as shown in FIGS. 5–8) serves to accommodate a fuel dispensing nozzle 34 of a service station fuel dispenser (not shown). The nozzle 34 is provided with a fill-limiting sensor port 36 to stop further flow of fuel from the nozzle 34 into the fuel tank 10. In this regard and as is conventional, the fill-limiting sensor port 36 serves to stop flow when fuel is in the filler neck 30 and contacts the sensor port 36. In addition, a oneway check valve 38 is provided in the filler neck 30 for preventing fuel from being expelled out of the mouth of the filler neck 30 under certain conditions.

The control valve 14 serves to direct the fuel vapor from the chamber 28 of the fuel tank 10 to the vapor recovery canister 12 via a line 40. The vapor recovery canister 12 serves to capture and store fuel vapors that are displaced and generated in the chamber 28 of the fuel tank 10 when the vehicle is being refueled and at other times when the vehicle is at a standstill or during operation of the vehicle. A vapor space 42 is provided in the upper interior region of the chamber 28 between the inner surface of the top wall 16 of the fuel tank 10 and the top surface 44 of the fuel in the fuel tank 10.

As best seen in FIG. 2–4, the control valve 14 is sealingly mounted to the top wall 16 of the fuel tank 10 and is composed of two major parts, namely a cap portion 46 and a body portion 48. The cap portion 46 is located exteriorly of the top wall 16 while the body portion 48 of the control valve 14 extends :into the vapor space 42 of the fuel tank 10. The cap portion 46 includes a flat disk shaped base 50 integrally formed with an L-shaped nozzle 52 provided with a vapor outlet opening 54 which is connected with a vapor inlet opening 56. The base 50 of the cap portion 46 is fixed in position relative to the top wall 16 of the fuel tank 10 and is also connected to the body portion 48 of the control valve 14. The body portion 48 includes an outer side wall 58 which is radially spaced from and surrounds a cylindrical valve assembly 60 which comprises a housing member 62 supporting a float valve 64. As seen in FIG. 2, the side wall 58 terminates at its lower end with a bottom annular edge 66 located in a plane parallel to the plane of the top surface 44 of the fuel in the fuel tank 10. As seen in FIG. 4, the side wall 58 is connected to the housing member 62 of the valve assembly 60 by several vertically extending web members 68 which are circumferentially spaced from each other and serve to define side by side channels 70. Although the channels 70 are separated from each other by the web members 68, during operation of the control valve 14 (as will be explained hereinafter), the channels 70, in effect, provide together an annular inlet channel for the fuel and vapor to enter the body portion 48 of the control valve 14.

As seen in FIGS. 3 and 4, the outer surface of the cylindrical side wall 58 of the body portion 48 is provided with an L-shaped fill tube 72. In the illustrated embodiment, the upper end of the tube 72 is formed with an orthogonal projection 74 having a plurality of slits (one of which is only shown and identified by reference numeral 76) that allow the projection 74 to be radially inwardly compressed and inserted into a circular opening 78 located in the side wall 58. After the projection 74 is inserted in the opening 78 of the side wall 58, the projection 74 expands to its normal pre-compressed size as shown in FIG. 3 so as to allow an enlarged outer rim 80 at the free end of the projection 74 to retain the latter in the opening 78. A seal member 82 which may be in the form of an O-ring encircles the projection 74 serves to seal the opening 78. It will be noted that the projection 74 is provided with an orifice 84 of a predetermined size which connects with a passage 86 in the tube 72 that extends vertically downwardly and, as seen in FIG. 2, terminates it a bottom annular edge 88 positioned at a level which constitutes the desired nominal-fill level of the fuel tank 10. The passage 86 is configured at least as large as the orifice 84 and can be larger if desired. A second orifice 90 of a size smaller than the orifice 84 is located in the wall of the tube 72 above the liquid fuel level and, in this instance, is shown as being in substantial horizontal alignment with the orifice 84. The orifice 90 serves to connect the vapor space 42 in the fuel tank 10 with the passage 865 of the tube 72.

As best seen in FIGS. 2 and 4, the housing member 62 of the valve assembly 60 is cylindrical in cross section and has several spaced fluid inlet openings 92 formed therein. Each of the inlet openings 92 is in the form of an elongated slot with its longitudinal center axis being vertically aligned and parallel to the side wall 58 of the body portion 48 of the control valve 14. Also, one of the inlet openings 92 is positioned between each pair of adjacent web members 68 as seen in FIG. 4.

As seen in FIG. 2, the housing member 62 of the valve assembly 60 defines a cylindrical valve chamber 94 which is vertically and centrally aligned with the inlet opening 56 in the cap portion 46 of the control valve 14. Located within the valve chamber 94 is the float valve 64 which is provided with a valve head 96. The outer diameter of the float valve 64 is slightly less than the diameter of the valve chamber 94 so as to allow vertical movement of the float valve relative to the housing member 62. In addition, the float valve 64 has a hollow interior which contains a coil spring 98 with the lower end of the spring 98 being seated on a circular base portion 100 of the housing member 62. The spring 98 serves to continuously bias the float valve 64 in an upwardly direction from its open position seen in FIG. 2 to the closed position of FIG. 6. In this regard, the float valve 64 is normally in the open position of FIG. 2 and it is not until fuel rises within the channels 70 and flows through the inlet openings 92 in the housing member 62 to a predetermined height that the float valve 64, with the assistance of the spring 98, will rise to the closed position and cause the valve head 96 to close the inlet opening 56 in the cap portion 46.

Prior to describing the operation of the control valve 14, it will be noted that the passage 86 within the tube 72 will be connected to atmospheric pressure through the line 40 which connects the control valve 14 with the canister 12. Also, the float valve 64 and the assist spring 98 are designed so that the float valve 64 normally rests on the base 100 of the housing member 62 and always attains its closed position to fully close the inlet opening 56 in the cap portion 46 of the control valve 14 prior to the liquid fuel in the valve chamber 94 of the housing member 62 and in the channels 70 rising to the height of the orifice 84. Accordingly, the orifice 84 is located above the liquid fuel level established in the valve chamber 94 by movement of the float valve 64 so as to close the inlet opening 56 of the control valve 1.4. In addition, the tube 72 is designed so that its bottom edge 88 is located at a level where one desires to have the fuel tank 10 filled to its predetermined nominal capacity and still maintain some vapor space between the top surface 44 of the fuel and the top wall 16 of the fuel tank 10. Also, it will be understood that the position of the bottom edge 66 of the side wall 58 relative to the position of the bottom edge 88 of the tube 72 will depend upon the amount of round-up one wishes to provide to the pump operator. In other words, the greater the distance between the two bottom edges 66 and 88, the greater the amount of "round-up" that will be available to the pump operator before he/she reaches the predetermined nominal fill level.

The operation of the control valve 14 will now be described as it would function during the time that fuel is being dispensed into the fuel tank 10 by a pump operator with the pump nozzle 34 being located in the filler neck 30 of the fuel tank as shown in FIGS. 5–8.

As seen in FIG. 2, the top surface 44 of the fuel in the fuel tank 10 is below the bottom edge 66 of the side wall 58 of the control valve. When the fuel is at this level, the pump operator can continue to dispense fuel into the fuel tank 10. The float valve 64 in the control valve 14 is in the open position and fuel being added to the fuel tank displaces the fuel vapor in the vapor space 42 so as to cause the vapor to flow to the canister 12 through the channels 70 in body portion 48, the inlet openings 92 in the housing member 62, the inlet opening 56 and outlet opening 54 in the cap portion 46, and the line 40. As the pump operator continues to dispense fuel into the fuel tank 10, the fuel vapor will continue to exit the fuel tank 10 via the channels 70 until the top surface 44 of the fuel rises to the level of the bottom edge 66 of the side wall 58 as seen in FIG. 3.

Figure 5:
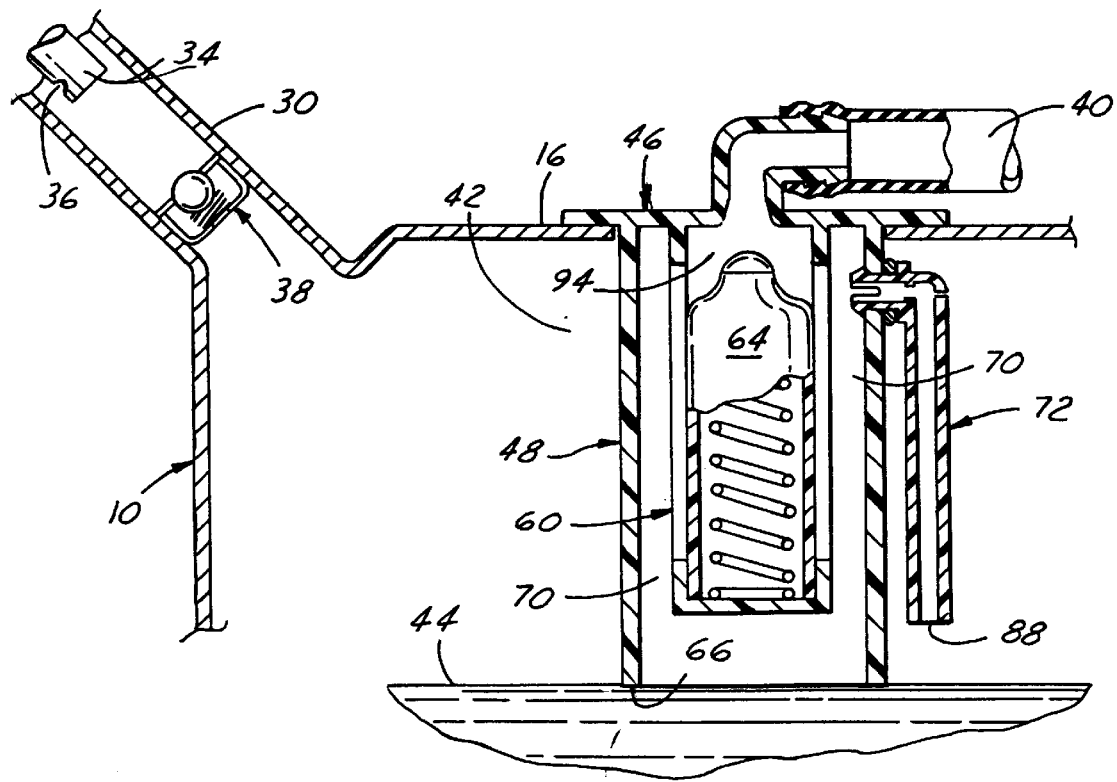
FIG. 5 is a diagrammatic view of the filler neck of the fuel tank with the pump nozzle located therein and the fuel in the fuel tank being at a first level prior to causing the float valve in the control valve to rise and prevent fuel vapor from flowing to the vapor recovery canister.
Figure 6:
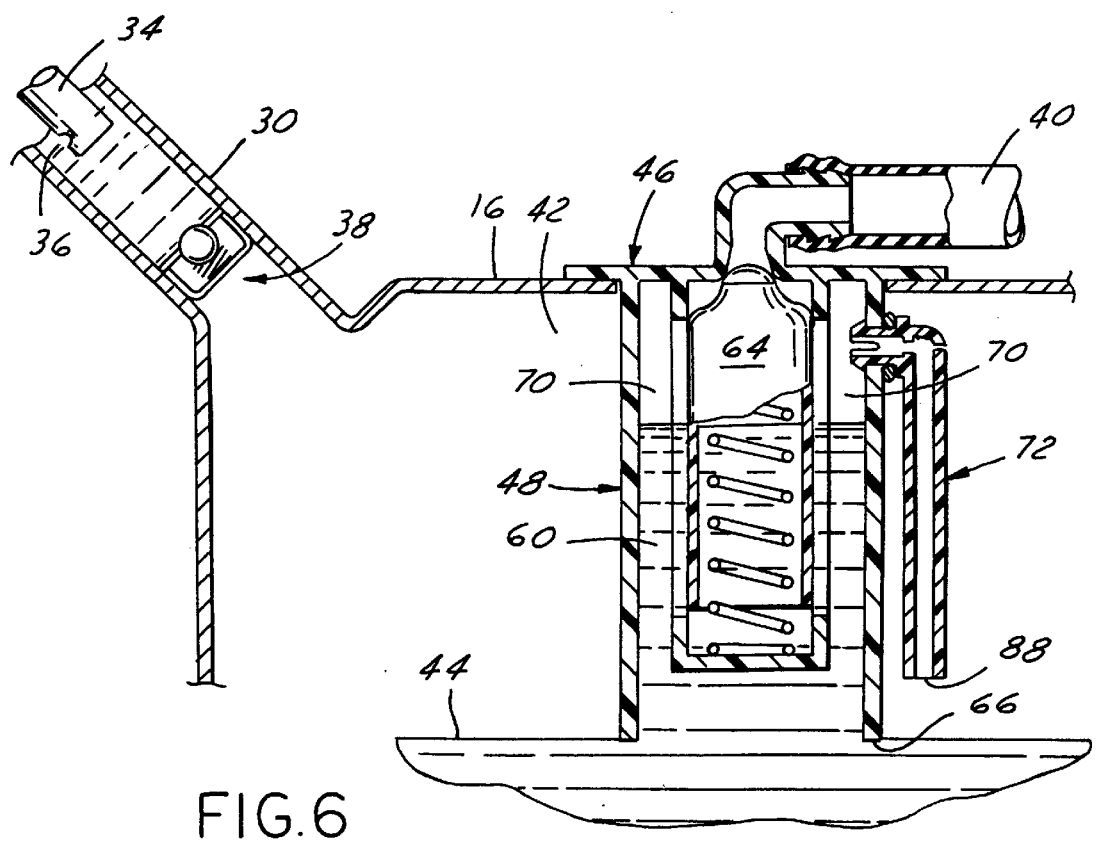
FIG. 6 is a view similar to that of FIG. 5 showing the fuel at the first level with an annular channel of the control valve filled with fuel and the float valve in the raised closed position with fuel in the filler neck of the fuel tank.

When the fuel level attains the level shown in FIG. 5, the channels 70 in the body portion 48 of the control valve 14 are closed off to the interior of the fuel tank. Continued dispensing of fuel into the fuel tank 10 will cause the pressure in the vapor space 42 of the fuel tank 10 to increase and this increase in pressure will cause the added fuel to rise in the channels 70 of the body portion 48 of the control valve 14 as shown in FIG. 6. The rise of fuel in channels 70 is not inhibited since the upper ends of the channels 70 and the valve chamber 94 are at or near atmospheric pressure. The increased fuel level in the channels 70 flows into the valve chamber 94 via inlet openings 92. As the fuel rises in the channels 70 and into the valve chamber 94, the float valve 64 moves upwards. When the fuel level in the valve chamber 94 rises to a predetermined level as seen in FIG. 6, the end portion 96 of the float valve 64 will close the inlet opening 56 in the cap portion 46. With inlet opening 56 closed, the vapor pressure in the tank's vapor space 42 will increase sufficiently to close the check valve 38 in the filler neck 30 which causes fuel dispensed into the filler neck 30 to "back-up" and splash the fill-limiting sensor port 36 on the pump nozzle 34 and stop further delivery of fuel from the nozzle.

Figure 7:
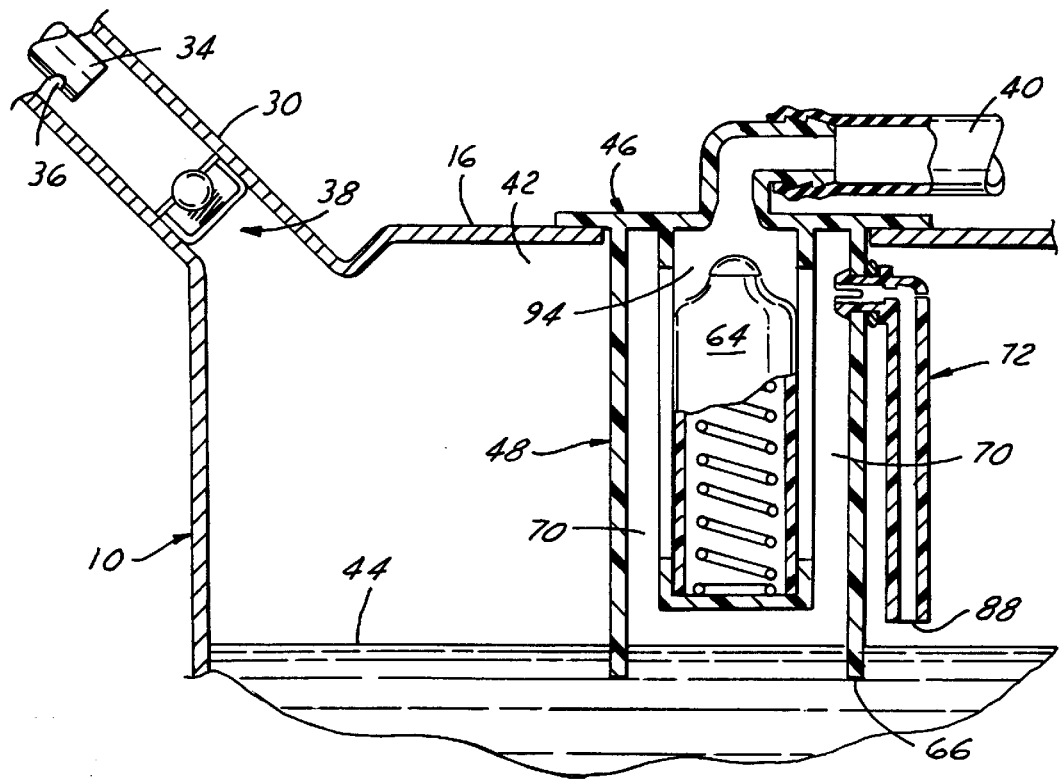
FIG. 7 is a view similar to that of FIGS. 5 and 6 showing the fuel at a level higher than the first level but below the predetermined nominal capacity level of the fuel tank.

When the fill nozzle 34 is deactivated, the fuel tank's vapor space 42 continues to be connected to the valve chamber 94 through passage 86 in tube 72 and through orifice 84 at the upper portion of the channels 70 at a position above the fuel level in the valve chamber 94. Resultantly, the heightened vapor pressure in the tank's vapor space 42 will be bleed through passage 86 in tube 72 and through orifice 84 to equalize the pressure in valve chamber 94 and in the vapor space 42. This will allow the fuel level in the channels 70 to drop to the same level as in the fuel tank which in turn allows the float valve 64 to move downward and open inlet opening 56 as shown in FIG. 7. In this condition, the vapor space 42 is again vented to the canister 12 through the passage 86, orifice 84, inlet opening 56, and conduit 40. Subsequently, the vapor pressure in the vapor space 42 of the fuel tank 10 is vented. Also, the decrease in tank pressure permits opening of the check valve 38 and thus permits fuel in the filler neck 30 to drain into the fuel tank 10 thus permitting a resetting and reactivation of the fill nozzle 34. During this period, it will be noted that the orifice 84 is sized sufficiently so that the equalization of pressure and the resultant opening of inlet 56 occurs relatively quickly.

Figure 8:
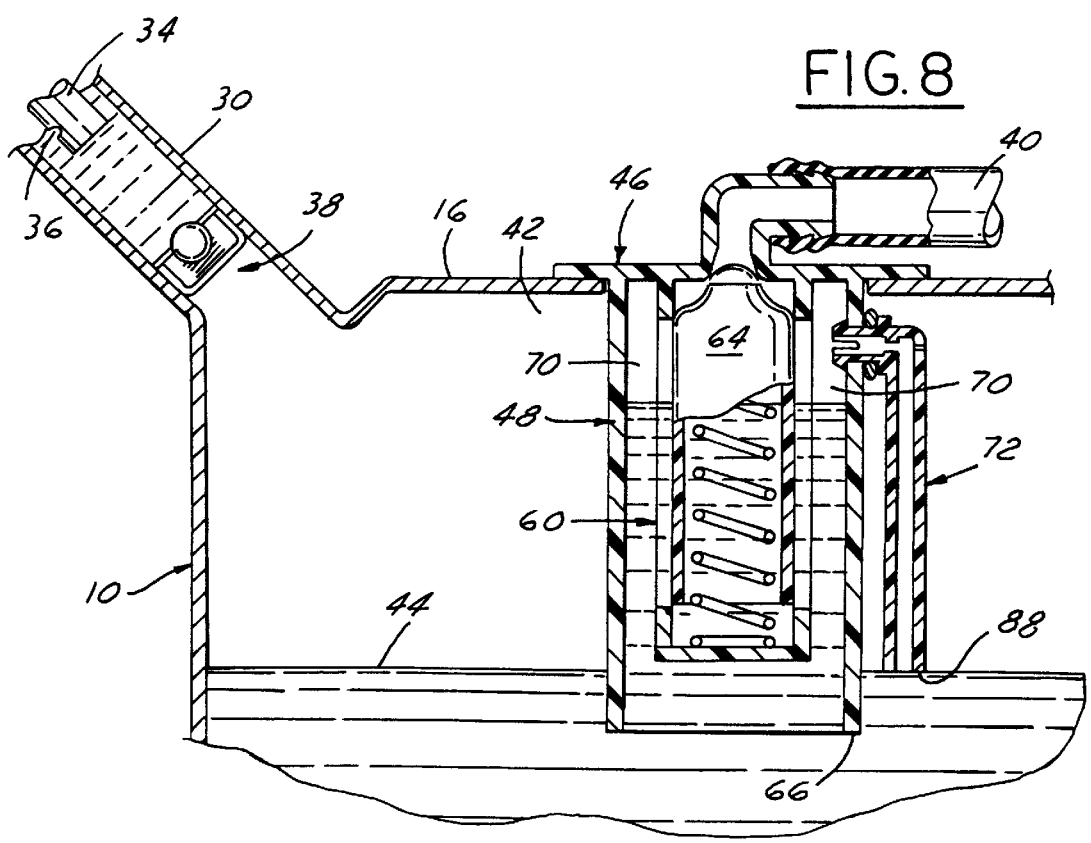
FIG. 8 is a view similar to that of FIGS. 5, 6, and 7 showing the fuel in the fuel tank at the predetermined nominal capacity level.

Usually for the purpose of rounding-up the quantity of fuel pumped to a desired cost, the fuel pump operator again begins to dispense fuel into the fuel tank 10. Typically, a fuel pump operator will repeat the above described events in the same sequence until the top surface 44 of the fuel reaches the bottom edge 88 of tube 72. When this occurs, an increased level of fuel in the channels 70 end the valve chamber 94 at the upper end of the channels 70 will again causes the float valve 64 to close the inlet opening 56 as shown in FIG. 8. At this point, the fuel level will rise into the tube 72 and rise to the level of the valve chamber 94. At this point, the only connection between the fuel tank's vapor space 42 and the valve chamber 94 will be through the second orifice 90. As previously mentioned, the orifice 90 is of a smaller size than the first orifice 84 and thus the time required for vapor pressure equalization between the vapor space 42 and the valve chamber 94 is significantly greater than when equalization occurs through the larger orifice 84. During this increased period, the pump operator will not be able to dispense additional fuel into the fuel tank 10 and is thus convinced that the fuel tank 10 is full. After the lengthened time period, float valve 64 again drops to open the inlet 56 allowing communication with the vapor canister. Thus, the level of fuel from channels 70 and the filler neck 30 drains into the fuel tank 10. According to this arrangement, the fuel tank 10 will not be overfilled.

It will be understood that various changes and modifications can be made in the control valve disclosed herein without departing from the spirit of the invention. Such changes and modifications are contemplated by the inventor and he does not wish to be limited except by the scope of the appended claims.

I claim:

1. A control assembly for establishing a desirable liquid fuel fill level in the interior of a fuel tank and for regulating a discharge of fuel vapor into a vapor recovery canister, comprising: the control assembly supported at an upper portion of the fuel tank and including a first portion with a vapor inlet operatively connected to the vapor recovery canister; the control assembly including a second portion having a tubular side wall and oriented with a substantially vertical axis; a moveable valve within the second portion and spaced from said side wall to define a fluid flow channel therebetween; said moveable valve including a liquid float which in a lower operative position allows fuel vapor to pass from said fuel tank, through said channel, into said vapor inlet, and to the vapor recovery canister; said tubular side wall terminating at a bottom edge positioned in the fuel tank interior at a first liquid level; said second portion including a fluid passageway extending parallel to said fluid flow channel and having a lower end portion terminating above said bottom edge of said tubular side corresponding to a second liquid fuel level higher than said first liquid fuel level to communicate the space in said fuel tank above the liquid level with said flow channel and vapor inlet when the liquid fuel level is between said first and second liquid fuel levels thereby allowing a flow of air and fuel vapor; a first orifice in said fluid passageway; said second portion carrying a second orifice sized smaller than said first orifice so as to pass air and fuel vapor from the interior of said fuel tank above the second liquid fuel level to said first orifice and then to said vapor inlet and the vapor recovery canister whenever the liquid fuel level has reached said second liquid fuel level closing said passageway wherein after fuel attains said first liquid level during fuel filling, the level of liquid fuel increases in said flow channel to lift said valve to a closed operative position thus blocking said vapor inlet which increases vapor pressure in said fuel tank sufficiently to terminate dispensation of fuel into said tank followed by a drop in the liquid level in said flow channel and resultant opening of the inlet reduction in vapor pressure thus again permitting an addition of liquid fuel into said fuel tank until the liquid level rises to said second liquid level which closes said passageway to said first orifice and termination of the dispensation of fuel into the fuel tank wherein a further addition of fuel is permitted only after a prolonged pressure equalization period by slow flow of air and fuel vapor through said second orifice.

2. A control assembly for establishing a desired liquid fuel fill level in the interior of a fuel tank and for regulating discharge of fuel vapor into a vapor recovery canister, comprising: the control assembly supported at an upper level of the fuel tank and including a cap portion defining a vapor inlet operatively connected to the vapor canister and further including a body portion which extends into the interior of the fuel tank; said body portion having a tubular side wall; a valving assembly within the tubular side wall which is spaced therefrom to define a fluid flow channel therebetween; said valving assembly including a liquid float member supported to normally allow fuel vapor to pass from said fuel tank, through said channel, into said vapor inlet, and to said vapor canister; said tubular side wall terminating at a bottom edge positioned in the fuel tank interior at a level corresponding to a first liquid fuel level; said body portion having a first orifice extending through said tubular side wall adjacent to said cap portion; a fluid passage carried by said body portion and extending downwardly from said first orifice terminating at a second liquid fuel level higher than said first liquid fuel level to communicate the space in said fuel tank above the liquid level with said flow channel and vapor inlet when the liquid fuel level is between said first and second liquid fuel levels thereby allowing a flow of air and fuel vapor to said first orifice; said body portion carrying a second orifice sized smaller than said first orifice which permits passage of air and fuel vapor from the interior of said fuel tank above the liquid fuel level to said first orifice and then to said flow channel, vapor inlet, and vapor canister whenever the liquid fuel level has reached said second liquid fuel level closing said passage wherein when fuel attains said first liquid level, fuel rises in said flow channel and lifts said float valve to close said vapor inlet opening thus producing an increase in vapor pressure in said fuel tank which stops dispensation of fuel into said fuel tank until the liquid level in said flow channel drops, the vapor inlet is opened, and vapor pressure decreases which permits addition of liquid fuel to said fuel tank, and subsequently after the liquid level is increased to said second liquid level closing off said passage to said first orifice, further addition of fuel is allowed only after a prolonged adjustment period caused by a substantially slower pressure equalization produced by air and vapor passage only through said second smaller sized orifice.

3. A fluid level control for establishing a desired fuel fill level in the interior of a fuel tank and for controlling the discharge of fuel vapor into a vapor recovery canister, said control being positioned at an upper level of said fuel tank and including a cap portion with a vapor inlet opening therein adapted to be connected to the vapor canister and including a body portion extends into said fuel tank interior, said body portion of the control valve housing a valving assembly encircled by a side wall spaced therefrom to define a flow channel therebetween, said valving assembly including a fluid float member and having an opening to allow fuel vapor to pass from said fuel tank through said channel and to said vapor canister through said vapor inlet opening in said cap portion, said side wall of said body portion terminating with a bottom edge located in the tank interior corresponding to a first fuel level, said body portion having a first orifice extending through said side wall adjacent to said cap portion communicating said tank's interior space with said flow channel, said body portion further including a passage extending from said first orifice downward and terminating at a second fuel level above said first fuel level established by the location of said body portion's bottom edge, said body portion having a second orifice sized smaller than said first orifice for passing fuel vapor from said fuel tank vapor space to said first orifice and thus to said flow channel and vapor canister when the fuel level in said fuel tank space has reached said second fuel level and consequently results in closure of said passage leading to said first orifice wherein when fuel is dispensed into said fuel tank and reaches said first level, internal pressure in said fuel tank causes fuel to rise in said flow channel and move said float causing closure of said cap portion's vapor inlet opening to prevent discharge of vapor to the canister and a resultant increase in vapor pressure which terminates dispensation of fuel into said fuel tank for a predetermined time until said float again moves to open said vapor inlet opening thereby again allowing additional fuel to be added to said fuel tank, and subsequently when the fuel level rises to said second level again causing closure of said vapor inlet opening, the resultant vapor pressure increase again terminates dispensation of fuel into said fuel tank for a second predetermined period of time greater than said first predetermined period of time as established by the decreased vapor flow through the smaller second orifice as compared to vapor flow through said larger first orifice.

4. A fluid level control for establishing the fill level in the interior of a fuel tank and for discharging fuel vapor into a vapor recovery canister, said fuel tank having a top wall, a bottom wall and side walls which define an interior into which fuel is adapted to be dispensed, said fuel tank including a filler neck member having an opening for insertion of a fuel fill nozzle during a fuel tank filling operation, said control valve being located adjacent said top wall of said fuel tank and comprising a cap portion and a body portion which extends into said fuel tank interior space, said cap portion having a vapor inlet opening and a vapor outlet opening with the vapor outlet opening being connected to said vapor recovered canister, said body portion of the control valve housing a valving assembly by surrounding side walls spaced therefrom to define a flow channel therebetween, said valving assembly including a fluid float member and having an opening to allow fuel vapor from said fuel tank to pass through said channel and into said vapor canister through said inlet opening and said outlet opening in said cap portion, said body portion's side wall terminating with a bottom edge positioned to correspond to a first desirable fuel level and having a first orifice of predetermined size formed in said side wall adjacent to said cap portion to communicate said interior space of said fuel tank with said flow channel, said body portion further including a passage connected to said first orifice and terminating at a second fuel level above said bottom edge of said side wall, said body portion having a second orifice sized less than said first orifice to allow fuel vapor in said fuel tank space to pass through said passage and through said first orifice into said flow channel when the fuel level in said fuel tank space has reached said second fuel level, wherein when fuel is dispensed into said fuel tank space and reaches said first level, the internal pressure in said fuel tank space causes fuel to rise in said flow channel and cause said float to close said valve assembly and thereby to close said cap portion's inlet opening for preventing dispensation of fuel into said fuel tank space for a predetermined time after which said float opens said valve assembly to allow additional filling of said fuel tank interior, and when said fuel rises to said second level internal pressure in said fuel tank causes the fuel to rise again in said annular channel to raise the float valve and again close said inlet opening in said cap portion to prevent fuel to be dispensed into said fuel tank for a time period greater than said predetermined time.

5. The control valve of claim 4 wherein said first orifice is defined by a channel forming member extending along said body portion and further has said passage formed therein.

6. The control valve of claim 5 wherein said second orifice is formed in said channel member.

7. The control valve of claim 6 wherein said second orifice is sized to produce a time period for equalizing vapor pressure that is substantially greater as the time period produced by said first orifice.

8. The control valve of claim 5 wherein said tubular member has a substantially L-shaped configuration and extends through an opening in said body portion.

9. A control valve for establishing a desired fuel fill level in a tank and for controlling discharge of fuel vapor to a vapor recovery canister, said fuel tank having a closed chamber into which fuel is adapted to be dispensed and having a top wall, a bottom wall and side walls and including a filler neck provided with an open mouth for accommodating a fuel nozzle having a fill limiting sensor, said control valve being sealingly mounted in said top wall of said fuel tank and comprising a cap portion and a body portion which extends into said fuel tank interior, said cap portion having a vapor inlet opening and a vapor outlet opening wherein the inlet opens to the fuel tank interior and the outlet connects with said vapor canister, said body portion including a tubular side wall surrounding a valve assembly radially spaced therefrom so as to define an annular channel therebetween, said valve assembly including a float valve therein normally positioned in a first position away from said vapor inlet opening wherein said vapor inlet opening is open and movable toward said cap portion to a second position wherein said vapor inlet opening is closed, said valve assembly being formed with at least one side opening to allow fuel vapor in said fuel tank to flow through said annular channel and said side opening to said vapor canister through said inlet opening and said outlet opening when said float valve is in said first position, said tubular side wall of said body portion terminating with an annular bottom edge located at a first fluid level and having a first orifice of a predetermined size formed in said side wall adjacent said cap portion for providing communication between said fuel tank interior and said annular channel, said body portion including a passage connected to said first orifice and terminating at a second fluid level above said annular bottom edge of said tubular side wall, said body portion having a second orifice of a size less than the size of said first orifice located near to said first orifice for allowing fuel vapor in said fuel tank to flow to said first orifice even when said passage is blocked by said second fluid level, the arrangement being such that when fuel is dispensed into said fuel tank and rises to said first level internal pressure in said fuel tank causes the fuel to rise in said channel to move the float valve from said first position to said second position to close said inlet opening in said cap portion and afterwards cause said fill limiting sensor to prevent fuel from being further dispensed into said fuel tank for a predetermined time after which said float valve moves from the second position to said first position as vapor bleeds through said first orifice and thus opens said vapor inlet valve to cause said fill limiting sensor to again allow further filling of said fuel tank, and then when fuel rises to said second level, internal pressure in said fuel tank causes fuel to rise again in said annular channel to move the float valve and again close said inlet opening in said cap portion which again causes said fill limiting sensor to prevent fuel being dispensed into said fuel tank for a relatively long time period as determined by vapor bleed through said second smaller orifice.

10. A control valve for establishing the fuel fill level of a fuel tank and for controlling fuel vapor to flow to a vapor recovery canister, said fuel tank having a closed interior into which fuel is adapted to be dispensed and being defined by a top wall, a bottom wall and side walls and including a filler neck provided with an open mouth for accommodating a fuel nozzle having a fill limiting sensor, said control valve being mounted in said top wall of said fuel tank and comprising a cap portion located above said top wall and a body portion which extends into said fuel tank, said cap portion having a vapor inlet opening communicating with said body portion and a vapor outlet opening which is connected with said vapor canister, said body portion including a tubular side wall surrounding a valve assembly and being radially spaced therefrom so as to define an annular channel, said valve assembly having a float valve therein that normally rests on a bottom wall of said valve assembly and has a first operative position wherein said vapor inlet opening is open and a second operative position wherein said vapor inlet opening is closed, said valve assembly being formed with a plurality of side openings so as to allow fuel vapor in said fuel tank to flow through said annular channel and said side openings in said valve assembly to said vapor canister through said inlet opening and said outlet opening in said cap portion when said float valve is in said first position, said tubular side wall of said body portion terminating with an annular bottom edge located at a first fluid level below said bottom wall of said valve assembly and having a first orifice of a predetermined size formed in said tubular side wall adjacent said cap portion for providing communication between said fuel tank interior and said annular channel, said body portion including a passage connected to said first orifice and located exteriorly of said tubular side wall, said passage terminating at a second fluid level above said annular bottom edge of said tubular side wall and in substantially horizontal alignment with said bottom wall of said valve assembly, said body portion having a second orifice of a size less than the size of said first orifice located near to said first orifice for allowing fuel vapor in said fuel tank interior to flow to said first orifice and to said annular channel when said fuel in said fuel tank is located at said second level, the arrangement being such that when fuel is dispensed into said fuel tank and rises to said first level, internal pressure in said fuel tank causes the fuel to rise in said annular channel and move the float valve from said first position to said second position to close said vapor inlet opening in said cap portion and afterwards cause said fill limiting sensor to prevent fuel from being further dispensed into said fuel tank for a predetermined time interval after which the fuel level in said channel drops and moves said float valve from the second position to said first position and opens said inlet valve to cause said fill limiting sensor to again allow further filling of said fuel tank, and then when said fuel rises to said second level, internal pressure in said fuel tank causes the fuel to rise again in said annular channel to move the float valve to the second position to close said vapor inlet opening in said cap portion and again cause said fill limiting sensor to prevent fuel being dispensed into said fuel tank for a time period greater than said predetermined time interval due to the slower bleed of vapor through said second smaller orifice.

* * * * *